US008189747B1

(12) United States Patent  (10) Patent No.: US 8,189,747 B1
Meubus et al.  (45) Date of Patent: May 29, 2012

(54) INTERNET-BASED TELEPHONE CALL MANAGER

(75) Inventors: Charles Meubus, Westmount (CA); Sylvain Jodoin, Montreal (CA); Alan Bernardi, Mount-Royal (CA)

(73) Assignee: Rockstar Bidco, LP, New York, NY (US)

( * ) Notice: Subject to any disclaimer, the term of this patent is extended or adjusted under 35 U.S.C. 154(b) by 1826 days.

(21) Appl. No.: 09/401,521

(22) Filed: Sep. 22, 1999

Related U.S. Application Data

(63) Continuation of application No. 08/911,036, filed on Aug. 14, 1997, now abandoned.

(60) Provisional application No. 60/023,903, filed on Aug. 14, 1996.

(51) Int. Cl.
*H04M 1/64* (2006.01)
*H04M 3/42* (2006.01)
*H04L 12/66* (2006.01)

(52) U.S. Cl. ............... 379/88.17; 379/215.01; 370/352

(58) Field of Classification Search .............. 379/88, 379/90–100.13, 215.01, 142.08, 142.04, 379/88.17, 221.08–221.12; 370/352–392
See application file for complete search history.

(56) References Cited

U.S. PATENT DOCUMENTS

| | | | |
|---|---|---|---|
| 4,771,425 A | 9/1988 | Baran et al. | 370/85 |
| 4,969,184 A | 11/1990 | Gordon et al. | 379/100 |
| 4,995,074 A | 2/1991 | Goldman et al. | 379/97 |
| 5,363,431 A | 11/1994 | Schull et al. | 379/67 |
| 5,434,906 A | 7/1995 | Robinson | 379/67 |
| 5,511,111 A * | 4/1996 | Serbetcioglu et al. | 379/88.01 |
| 5,513,251 A * | 4/1996 | Rochkind | 379/93 |
| 5,533,110 A | 7/1996 | Pinard et al. | 379/201 |
| 5,572,583 A * | 11/1996 | Wheeler et al. | 379/207 |
| 5,577,105 A | 11/1996 | Baum et al. | 379/93 |
| 5,604,737 A | 2/1997 | Iwami | 370/352 |
| 5,608,786 A | 3/1997 | Gordon | 379/100 |
| 5,610,910 A | 3/1997 | Focsaneanu et al. | 370/351 |
| 5,625,676 A * | 4/1997 | Greco et al. | 379/88 |
| 5,805,587 A * | 9/1998 | Norris et al. | 370/352 |
| 5,809,128 A * | 9/1998 | McMullin | 379/215 |
| 5,884,262 A * | 3/1999 | Wise et al. | 704/270 |
| 5,982,774 A * | 11/1999 | Foladare et al. | 370/401 |
| 6,038,305 A * | 3/2000 | McAllister et al. | 379/207 |
| 6,069,890 A * | 5/2000 | White et al. | 370/352 |
| 6,097,795 A * | 8/2000 | Ungruh et al. | 379/93.35 |

(Continued)

FOREIGN PATENT DOCUMENTS

CA 2110711 1/1993
(Continued)

*Primary Examiner* — Joseph T Phan
(74) *Attorney, Agent, or Firm* — Withrow & Terranova, PLLC

(57) ABSTRACT

A method is provided that allows data access service provider subscribers to manage their telephone service through a data connection. The subscriber is enabled to obtain call data information and is provided real time control. During a data call, a visual incoming call indicator informs the subscriber, through a popup window, connected to the data access service provider that there is a call attempt. A visual message waiting indicator allows a subscriber, connected to the data access service provider to be notified of a pending message on the voice message system. A visual call disposition allows the subscriber, through the data connection, to dispose of calls. The call disposition options include forwarding a call to voice mail, playing an announcement to the calling party, forwarding the call to another line, sending a text message which could be converted to speech using text to speech technology, answering the call using voice over data call or terminating the data connection in order to accept the call.

39 Claims, 8 Drawing Sheets

U.S. PATENT DOCUMENTS

| | | | | |
|---|---|---|---|---|
| 6,144,657 | A * | 11/2000 | Baehr | 370/352 |
| 6,167,043 | A * | 12/2000 | Frantz | 370/356 |
| 6,178,183 | B1 * | 1/2001 | Buskirk, Jr. | 370/493 |
| 6,188,688 | B1 * | 2/2001 | Buskirk, Jr. | 370/389 |
| 6,208,718 | B1 * | 3/2001 | Rosenthal | 379/93.35 |
| 6,243,374 | B1 * | 6/2001 | White et al. | 370/352 |
| 6,269,159 | B1 * | 7/2001 | Cannon et al. | 379/202.01 |
| 6,304,566 | B1 * | 10/2001 | Schessel | 370/354 |
| 6,317,488 | B1 * | 11/2001 | DePond et al. | 379/93.35 |
| 6,320,879 | B1 * | 11/2001 | Bremer | 370/493 |
| 6,366,661 | B1 * | 4/2002 | Devillier et al. | 379/211.01 |
| 6,377,668 | B1 * | 4/2002 | Smock et al. | 379/142.08 |
| 6,389,132 | B1 * | 5/2002 | Price | 379/265.01 |
| 6,407,996 | B1 * | 6/2002 | Witchalls | 370/352 |
| 6,463,146 | B1 * | 10/2002 | Hartley et al. | 379/215.01 |
| 6,507,646 | B1 * | 1/2003 | Fishler | 379/215.01 |
| 6,519,252 | B2 * | 2/2003 | Sallberg | 370/356 |
| 6,526,043 | B1 * | 2/2003 | Fogelholm et al. | 370/352 |
| 6,560,239 | B1 * | 5/2003 | Frid et al. | 370/426 |
| 6,631,186 | B1 * | 10/2003 | Adams et al. | 379/201.12 |
| 6,693,897 | B1 * | 2/2004 | Huang | 370/352 |
| 6,718,021 | B2 * | 4/2004 | Crockett et al. | 379/93.23 |
| 6,757,274 | B1 * | 6/2004 | Bedingfield et al. | 370/352 |
| 6,763,091 | B2 * | 7/2004 | Shimada | 379/88.19 |
| 6,775,368 | B1 * | 8/2004 | Lee et al. | 379/211.02 |
| 6,816,469 | B1 * | 11/2004 | Kung et al. | 370/260 |
| 6,816,481 | B1 * | 11/2004 | Adams et al. | 370/352 |
| 6,826,173 | B1 * | 11/2004 | Kung et al. | 370/352 |
| 6,847,631 | B1 * | 1/2005 | Lawser et al. | 370/352 |
| 6,868,155 | B1 * | 3/2005 | Cannon et al. | 379/376.01 |
| 6,889,321 | B1 * | 5/2005 | Kung et al. | 713/153 |
| 6,891,940 | B1 * | 5/2005 | Bhandari et al. | 379/142.06 |
| 6,954,524 | B2 * | 10/2005 | Gibson | 379/211.02 |
| 6,993,014 | B2 * | 1/2006 | Bedingfield et al. | 370/352 |
| 7,054,428 | B1 * | 5/2006 | Berthoud et al. | 379/215.01 |
| 7,076,045 | B2 * | 7/2006 | Gibson | 379/211.02 |
| 7,103,165 | B2 * | 9/2006 | Baniak et al. | 379/201.02 |
| 7,149,208 | B2 * | 12/2006 | Mattaway et al. | 370/352 |
| 7,155,001 | B2 * | 12/2006 | Tiliks et al. | 379/196 |
| 7,167,550 | B2 * | 1/2007 | Klos et al. | 379/201.01 |
| 7,177,415 | B1 * | 2/2007 | Kim et al. | 379/216.01 |
| 7,180,889 | B1 * | 2/2007 | Kung et al. | 370/352 |
| 7,197,030 | B2 * | 3/2007 | Witchalls | 370/356 |
| 7,206,398 | B2 * | 4/2007 | Culli et al. | 379/221.01 |
| 7,216,348 | B1 * | 5/2007 | deCarmo | 718/105 |
| 7,224,774 | B1 * | 5/2007 | Brown et al. | 379/88.14 |
| 7,228,143 | B1 * | 6/2007 | Hamalainen et al. | 455/458 |
| 7,236,485 | B2 * | 6/2007 | Lim et al. | 370/352 |
| 7,242,754 | B2 * | 7/2007 | Adams et al. | 379/201.02 |
| 7,245,612 | B2 * | 7/2007 | Petty et al. | 370/356 |
| 7,257,427 | B2 * | 8/2007 | Diedrich et al. | 455/569.2 |
| 7,289,489 | B1 * | 10/2007 | Kung et al. | 370/352 |
| 7,317,787 | B2 * | 1/2008 | Crockett et al. | 379/88.03 |
| 7,336,653 | B2 * | 2/2008 | Adams et al. | 370/352 |
| 7,337,220 | B2 * | 2/2008 | Kortum et al. | 709/223 |
| 7,415,007 | B2 * | 8/2008 | Huang | 370/352 |
| 7,450,701 | B2 * | 11/2008 | Crockett et al. | 379/93.23 |
| 7,492,787 | B2 * | 2/2009 | Ji et al. | 370/466 |
| 7,502,362 | B1 * | 3/2009 | Koskinen et al. | 370/352 |
| 7,502,457 | B2 * | 3/2009 | McBlain et al. | 379/210.01 |
| 7,558,251 | B1 * | 7/2009 | Huang et al. | 370/352 |
| 7,567,551 | B1 * | 7/2009 | Lawser et al. | 370/352 |
| 7,616,747 | B2 * | 11/2009 | Wurster et al. | 379/207.02 |
| 7,657,014 | B2 * | 2/2010 | Holt et al. | 379/201.01 |
| 7,664,097 | B2 * | 2/2010 | White et al. | 370/352 |
| 7,702,792 | B2 * | 4/2010 | Shaffer et al. | 709/227 |
| 7,809,121 | B2 * | 10/2010 | Gruchala et al. | 379/114.24 |
| 7,813,332 | B1 * | 10/2010 | Voit et al. | 370/352 |
| 7,817,619 | B1 * | 10/2010 | Curry et al. | 370/352 |
| 7,830,860 | B2 * | 11/2010 | Farris et al. | 370/352 |
| 7,835,344 | B1 * | 11/2010 | Bartholomew et al. | 370/352 |
| 7,916,715 | B2 * | 3/2011 | Rezaiifar et al. | 370/352 |
| 7,940,746 | B2 * | 5/2011 | Livingood | 370/352 |
| 7,948,968 | B2 * | 5/2011 | Voit et al. | 370/352 |
| 8,077,653 | B2 * | 12/2011 | Kuure et al. | 370/328 |

FOREIGN PATENT DOCUMENTS

| | | |
|---|---|---|
| CA | 2197204 | 2/1996 |
| EP | 0 732 835 | 9/1996 |
| WO | WO 94/24803 | 10/1994 |
| WO | WO 95/18501 | 7/1995 |
| WO | WO 96/05684 | 2/1996 |
| WO | WO 96/09714 | 3/1996 |
| WO | WO 96/38018 | 11/1996 |
| WO | WO 97/26749 | 7/1997 |
| WO | WO 97/35416 | 9/1997 |
| WO | WO 97/37483 | 10/1997 |
| WO | WO 97/47118 | 12/1997 |
| WO | WO 98/01985 | 1/1998 |

* cited by examiner

INTERNET-BASED TELEPHONE CALL MANAGER

CROSS REFERENCE TO RELATED APPLICATIONS

This is a continuation application of U.S. patent application Ser. No. 08/911,036, filed Aug. 14, 1997, now abandoned, claiming priority from U.S. Provisional Patent Application No. 60/023,903 filed Aug. 14, 1996.

FIELD OF THE INVENTION

The present invention relates to handling telephone related messages during data communications sessions.

BACKGROUND TO THE INVENTION

As a result of the increasing popularity of the Internet and the World Wide Web, more and more users stay connected to their Internet service provider, mainly through dial-up modem connections, for durations well exceeding the average holding time for voice calls (3 minutes). During these calls, the call waiting indicator is usually disabled since the tone generated by this feature would disrupt the data stream. Since the Internet session in most cases occupies the only telephone line in the house, the subscriber is neither able to detect nor respond to a call attempt.

SUMMARY OF THE INVENTION

It is an object of the present invention to provide improved telephone call handling during data communication sessions.

According to one aspect of the present invention there is provided a method of providing an indication of an incoming call to a called station coupled to a telecommunications network, the called station having a data processing terminal engaged in a data call with a data communications network, the data call being through a connection in the telecommunications network to an access gateway for the data network, the method comprising the steps of providing a signal advising of the incoming call from the access gateway, over the data call connection through the telecommunications network, to the data processing terminal and generating by the data processing terminal, responsive to receiving the signal, an incoming call indication.

According to another aspect of the present invention there is provided a method of providing an indication of a message waiting at a voice messaging service to a called station coupled to a telecommunications network, the called station having a data processing terminal engaged in a data call with a data communications network, the data call being through a connection in the telecommunications network to an access gateway for the data network, the method comprising the steps of providing, by the telecommunications network, an incoming call intended for the called station to a voice messaging service whereby the incoming call may record a message, providing a signal advising of the message waiting from the access gateway, over the data call connection through the telecommunications network, to the data processing terminal and generating by the data processing terminal, responsive to receipt of the signal, the message waiting indication.

According to a further aspect of the present invention there is provided a method of disposing of an incoming call intended for a called station coupled to a telecommunications network, the called station having a data processing terminal engaged in a data call with a data communications network, the data call being through a connection in the telecommunications network to an access gateway for the data network, the method comprising the steps of holding call processing of the incoming call at a switching system in the telecommunications network, providing a signal advising of the incoming call from the access gateway, over the data call connection through the telecommunications network, to the data processing terminal, receiving from the data processing terminal, via the access gateway, instructions for disposing of the incoming call and continuing the call processing of the incoming call at the switching system according to the received instructions.

According to an additional aspect of the present invention there is provided a system for interconnecting a telecommunications network and a data communications network, comprising a telecommunications gateway and a data network gateway adapted to interface the telecommunications network and the data network, one or more stations coupled to the telecommunications network, each station having a data terminal and a telephone terminal, means for recognizing, responsive to an incoming call being directed to a particular station, that the data terminal of the particular station has a data call connection through the telecommunications network to the data network and means for signaling information relating to the incoming call from the telecommunications network, via the telecommunications and data network gateways, over the data call connection to the data terminal of the particular calling station.

According to a still further aspect of the present invention there is provided a method of managing telephone service to a called station coupled to a telecommunications network while the called station is engaged in a data call, the method comprising the steps of providing a message indicative of an incoming call to the called station via the data call, accepting a message from the called station via the data call and disposing of the incoming call in response to the accepted message.

The present invention has the advantage of allowing a subscriber to monitor and control telephone services while engaged in a data call, via the data call.

The basic concept behind the present invention is to combine the Public Switched Telephone Network (PSTN) and the Internet service providers' enhanced signaling and data communication capabilities to provide incoming call information and control to an Internet subscriber. With the Internet Call Manager, the subscriber is informed of call attempts and can dispose of the call as deemed appropriate. Furthermore, subscribers connected by modem cannot check if they have pending messages without terminating their session. The visual message waiting indicator allows them to be informed of their mailbox status within their Internet session.

Terminology and Acronyms

Caller Person that calls the subscriber. The caller can reach the subscriber in two ways, either directly, i.e., the caller dials the subscriber's DN, or indirectly, i.e., the caller dials a DN that is forwarded to the subscriber's DN.

Data Access Service Provider (DASP) Data network operator that sells access services to its data network that allows the subscribers to communicate through the DASP's network and other data networks.

DASP User Person that subscribes to and uses DASP services.

Forwarding from Station Number (FF) Parameter conveyed over the control between the PSTN and the VMS system and used by the VMS system as the mailbox identifier.

Subscriber A DASP user that subscribes also to the Call Manager service.

VMS Subscriber Person that subscribes to a VMS.

Acronyms
BRI—Basic Rate Interface
CPE—Customer Premise Equipment
DASP—Data Access Service Provided
DN—Directory Number
ICM—Internet Call Manager
ISDN—Integrated Services Digital Network
ISP—Internet Service Provider
MWI—Message Waiting Indicator
PSTN—Public Switched Telecommunication Network
SMDI—Simplified Message Desk Interface
SS7—Signaling System #7
VMS—Voice Messaging Service
VMS-SP—VMS Service Provider An advantage of the method of the present invention is allowing data access service providers (DASP) subscribers to manage their telephone service through their DASP connection. The subscriber can obtain call data information and provides real time call control.

The service in accordance with an embodiment of the present invention has the following components.

A Visual Incoming Call Indicator (VICI) informs a subscriber through a popup window connected to the DASP that there is a call attempt. When available the user could be provided with the CLID and the calling name. Another version of this feature could inform the subscriber of a call attempt through Email.

A Visual Message Waiting Indicator (VMWI) allows a subscriber connected to the DASP to be notified of pending message on the VMS through a convenient screen display.

A Visual Call Disposition (VCD) allows the subscriber through the DASP connection to dispose of the calls following a visual incoming call indication. The subscriber can optionally:
forward the call to voice mail
play an announcement (perhaps personalized)
forward the call to another line
send a text message which would be read using text to speech technology
answer the call using voice over Internet
terminate or park the Internet connection and take the call.

A method in accordance with the present invention introduces the concept of combining the Public Switched Telephone Network (PSTN) and Data Access Service Provider (DASP) enhanced signaling and data communication capabilities to provide incoming call information and control to a DASP subscriber.

In the following descriptions, specific instances of the PSTN enhanced signaling capabilities are used for the purpose of describing the concept. However, those skilled in the art will recognize that the scope of this invention is not limited to these specific instances. To ease description, functional call flows are used.

BRIEF DESCRIPTION OF THE DRAWINGS

The present invention will be further understood from the following description with reference to the drawings in which.

DETAILED DESCRIPTION

Figure 1:
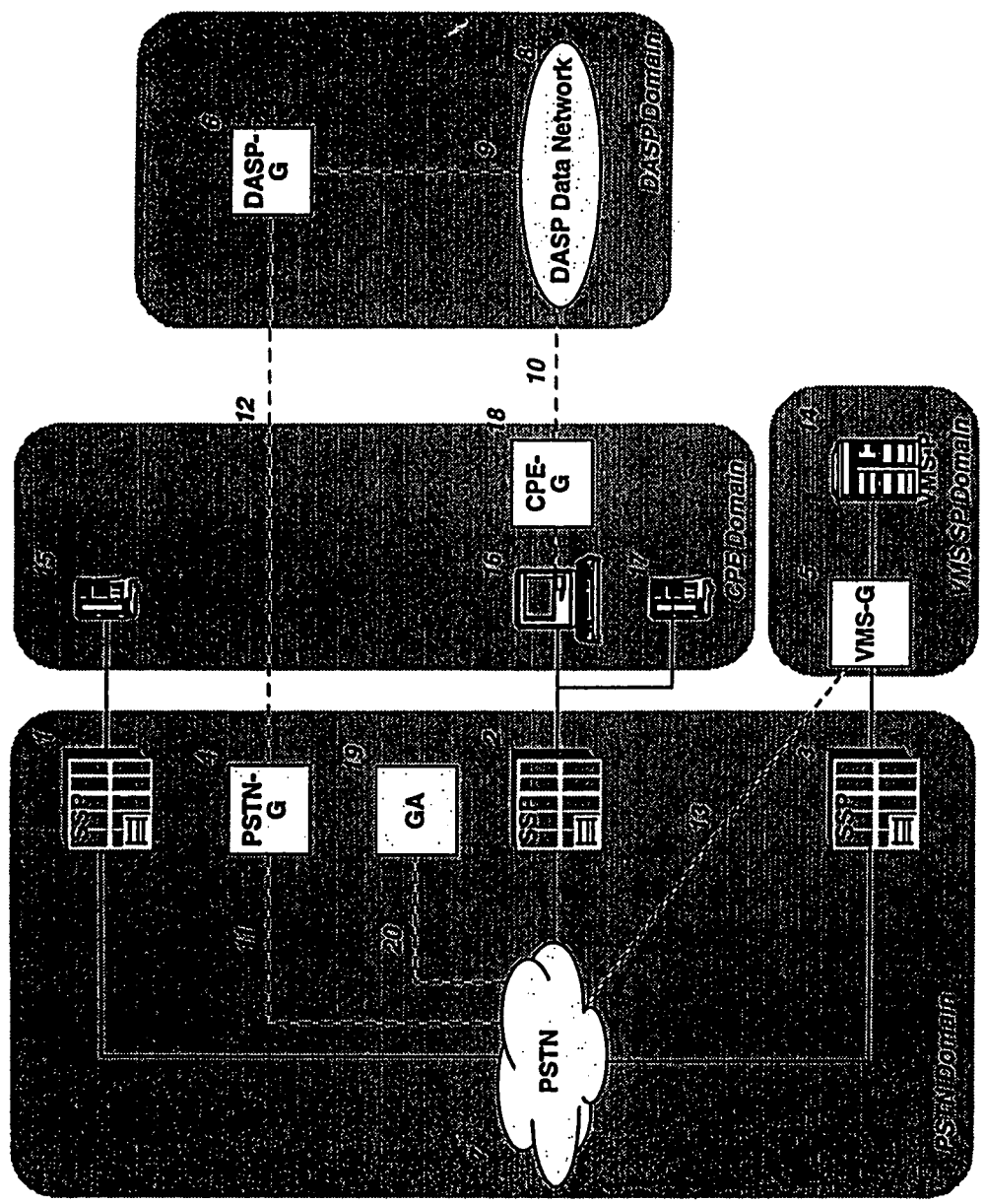
FIG. 1 illustrates an overview of a network in which the method in accordance with the present invention can be used.

Referring to FIG. 1 there is provided a view of the network components and interfaces required by this method. The network components are grouped into four (4) domains, i.e., the PSTN domain, the DASP domain, the Voice Message Service—Service Provider (VMS-SP) domain and the Customer Premise Equipment (CPE) domain. The PSTN domain network components are the SS7-capable telecommunication switches, labeled Service Switching Point SSP [1, 2, 3], the Public Switched Telephone Network, labeled PSTN [7], the PSTN Gateway Agent, labeled GA [19] and the PSTN gateway, labeled PSTN-G [4]. The DASP domain network components are the DASP gateway, labeled DASP-G [6] and the DASP data network [5]. The VMS-P [14] and the VMS gateway, labeled VMS-G [5]. For conciseness, the VMS gateway [5] is shown as being port of the VMS-SP domain. However, depending on the implementation, the VMS gateway [5] component may be outside of the VMS-SP domain and may be part of the PSTN domain. The CPE domain components are the caller's telephone [15], the DASP subscriber's telephone [17] and computer [16] and the CPE gateway, labeled CPE-G [18].

In FIG. 1, interfaces [9, 10, 11, 12, 13, 20], shown as direct link between network components and functions, illustrate the logical relationships between these components and functions and as such, have no implications on the physical paths, either direct of indirect, and signaling supports used in the different implementations of this invention.

The PSTN gateway (PSTN-G) [4] is the PSTN component that implements the PSTN-DASP signaling. Through interface [12], the PSTN gateway provides the DASP gateway with the incoming call indication and control for all registered subscribers [17]. Via interface [11], the PSTN gateway mediates with the other PSTN network components, including but not limited to the SSPs [1, 2, 3], the PSTN Gateway Agent [19] through interface [20] and the VMS-SP's VMS gateway [5] through interface [13], to obtain the incoming call information, the MWI information and to remotely control call establishment in the case of call disposition service, for incoming calls to subscriber [17].

The PSTN Gateway Agent (GA) [19] is the PSTN component that provides the PSTN-G [4] with the incoming call information and remote call control for incoming calls to registered subscribers [17].

The VMS-SP's VMS gateway's (VMS-G) [5] responsibility is to provide the PSTN gateway [4] with the MWI information for registered subscribers [17].

The DASP gateway (DASP-G) [6] is the DASP component that implements the PSTN-DASP signaling. Through interface [12], the DASP gateway obtains from the PSTN gateway [4] the incoming call indication and control for all registered subscribers [17]. The main responsibility of the DASP gateway is then to mediate, through interface [9], DASP data network [8] and interface [10], with the subscriber's [17]. For call disposition service, the CPE gateway receives the subscriber's inputs from the HMI and translates the call disposition request in the appropriate message format for delivery to the DASP gateway [6].

The above components can be implemented in various ways. A single component can be implemented as a stand-alone network equipment, multiple components can be combined in a single network equipment or a given component can be partitioned over two (2) or more network equipments.

In the following sections, methods and systems are described which implement the service components of this invention, namely, call indication, MWI delivery and call disposition. However, the scope of this invention is not limited to these implementations, which are merely illustrative. Finally, for each service component, a specific service scenario issued for simplicity of description only. The invention is not limited to these service scenarios.

The following data is used in the functional flows:
caller's DN is Dnc
caller's name is Name_c
subscriber's DN is Dns
subscriber's Name is Name_s
DASP gateway's DN is Dng (where applicable)
VMS's DN is Dnv.

Incoming Call Indication

Figure 2:
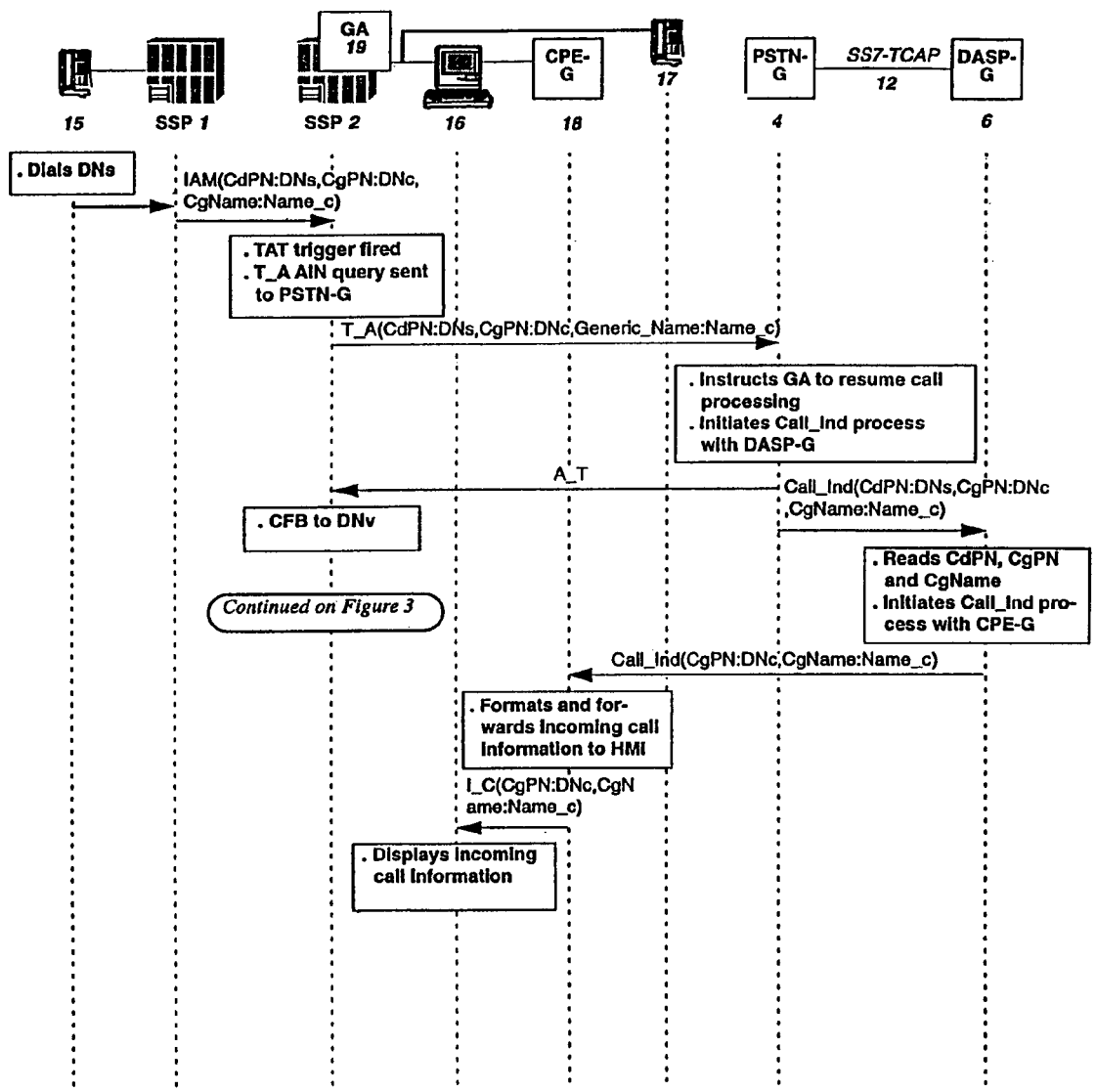
FIGS. 2 and 3 graphically illustrate the call-indication functional flow in accordance with another embodiment of the present invention.
Figure 3:
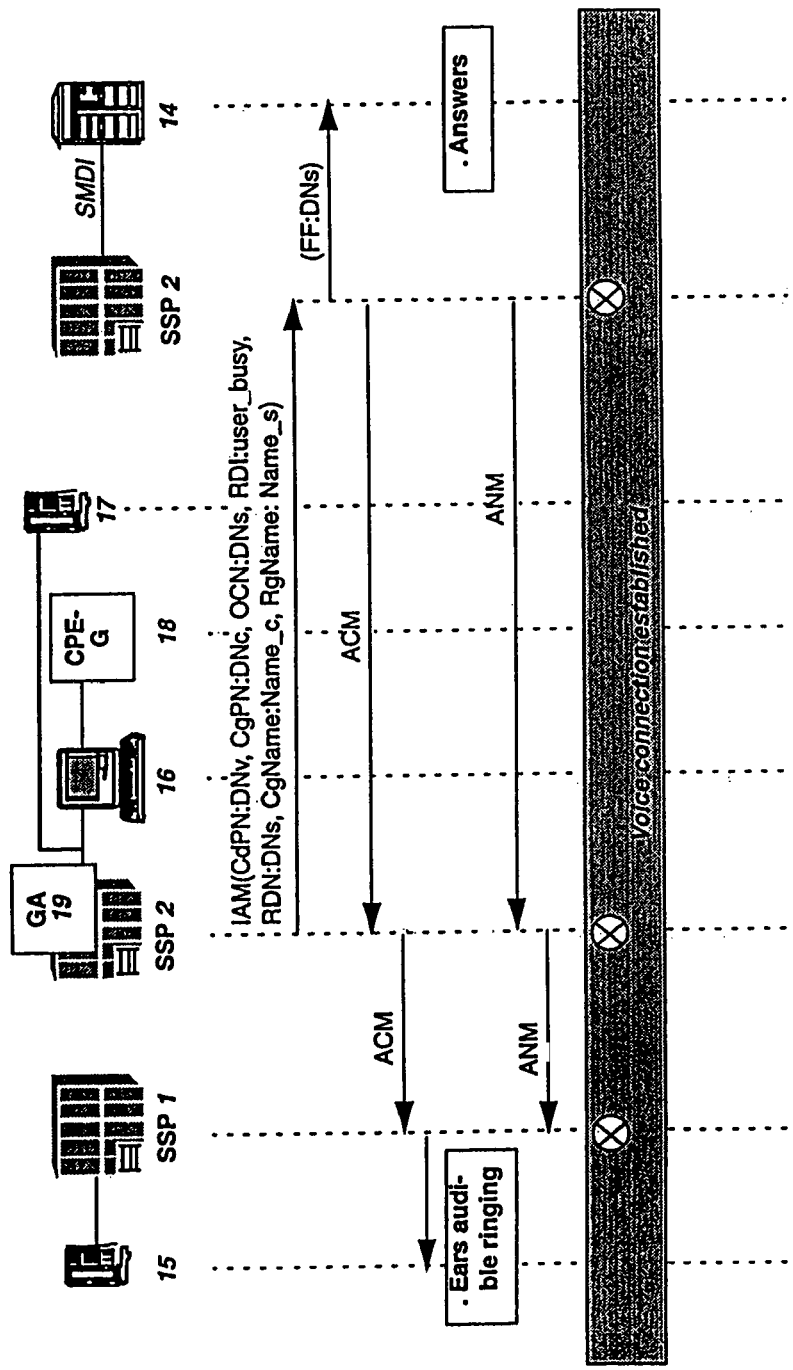

Referring to FIGS. 2 and 3 there is provided a detailed functional flow for a specific implementation of the call indication service component. The following service scenario is used in the functional flow for description purposes only, the method not being limited to this service scenario:
the subscriber subscribes to a VMS
the subscriber's telephone line is busy due to a dial-up data session to the DASP.
all calls are interswitch.

In this implementation of the invention, the GA [19] is implemented using the AIN call model on SSP [2]. The PSTN-G [4] component could be implemented in many ways, including but not limited to an Advanced Intelligent Network (AIN) Service Control Point (SCP) an SS7 protocol analyzer and an SS7 mediation point. The PSTN signaling capabilities used are the Signaling System #7 (SS7) Transaction Capability Application Part (TCAP) as interfaces [11], [12] and [20].

The AIN call model GA [19] at the subscriber's [17] SSP [2] is used to detect incoming calls to subscriber's DN, using, for example, the AIN Termination_Attempt trigger. It communicates with the PSTN-G [4] using the SS7-based AIN SSP-t-SCP protocol as interfaces [11] and [20]. Upon incoming call to subscriber [17], the SSP [2] AIN Termination_Attempt trigger gets fired and sends incoming call information, including the caller's [15] DN and name, to the PSTN-G [4], using, for example, the AIN Termination_Attempt message, in which case the PSTN-G [4] could answer with an Authorize_Termination message. The PSTN-G [4] can then provide the DASP-G [6] with the required incoming call indication information. The DASP G [6], through a standard data communication protocol, including but not limited to TCP/IP, HTTP and FTP, communicates the information to the CPE-G [18]. This information is then formatted and displayed to the user.

Figure 4:
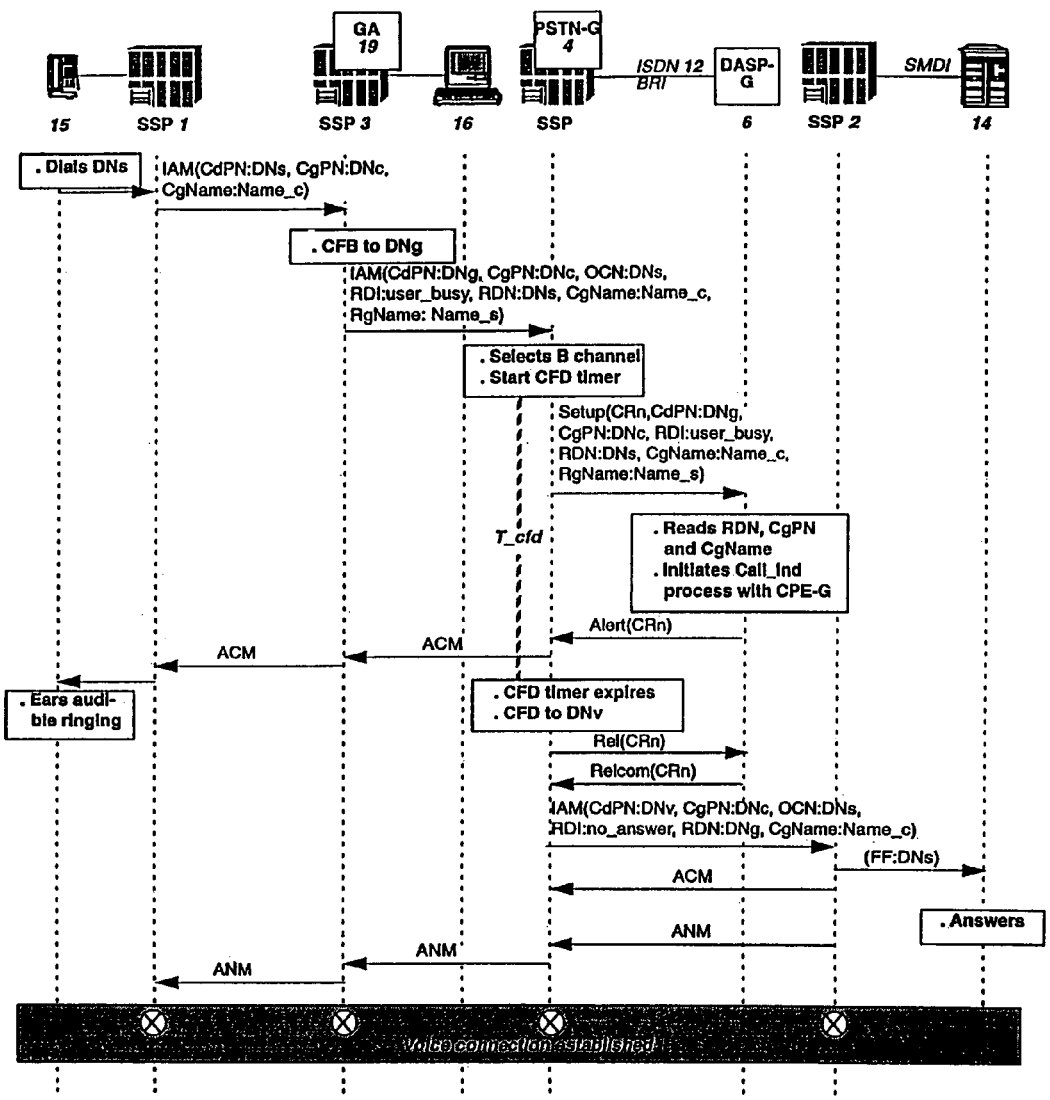
FIG. 4 graphically illustrates the call-indication functional flow in accordance with a further embodiment.

The terms used are:
TA: AIN Termination_Attempt trigger
TA: AIN Termination_Attempt SSP-SCP message
A_T: AIN Authorize_Termination SCP-SSP message
IAM: SS7 ISUP Initial Address Message
ACM: SS7 ISUP Address Complete Message
ANM: SS7 ISUP Answer Message
FF: SMDI Forwarded From number
CdPN: Called Party Number parameter
CgPN: Calling Party Number parameter
CgName: Calling Party Name parameter
OCN: Originally Called Number parameter
RDI: Redirecting Indicator parameter
RDN: last Redirecting Number parameter
RgName: Redirecting Name parameter Other implementations of this method to deliver the call indication service component are possible. They include but are not limited to the following one. Referring to FIG. 4 there is illustrated an embodiment of the present method. In this implementation of the invention, the GA [19] is implemented using the SSP-based [2] Call Forward Busy (CFB) telephony feature, the PSTN [4] component is implemented by a PSTN SSP and the PSTN signaling capabilities used are:
the Signaling System #7 (SS7) Integrated Services Digital Network User Park (ISUP) as interface [11] and [20]
the Integrated Services Data Network—Basic Rate interface (ISDN-BRI) as interface [12]
the Simplified Message Desk Interface (SMDI) for PSTN to VMS system signaling.

Terms used are:
Setup: ISDN BRI call Setup message
Alert: ISDN BRI Alert message
Rel: ISDN BRI Release message
CRn: ISDN BRI Call Reference number n
CFB: PSTN Call Forward Busy Feature
CFD: PSTN Call Forward Don't Answer feature
T_cfd: CFD timer Message Waiting Indicator (MWI) Delivery Referring to FIG. 5, there is illustrated a detailed functional flow for a specific implementation of the MWI delivery service component. The following service scenario is used in the functional flow in FIG. 5 for description purposes only, the method not being limited to this service scenario:
the subscriber subscribes to the VMS
the subscriber's telephone line is busy due to a dial-up data session to the DASP.
all calls are interswitch
a message for the DASP subscriber [17] has just been left at VMS-P [14].

Figure 5:
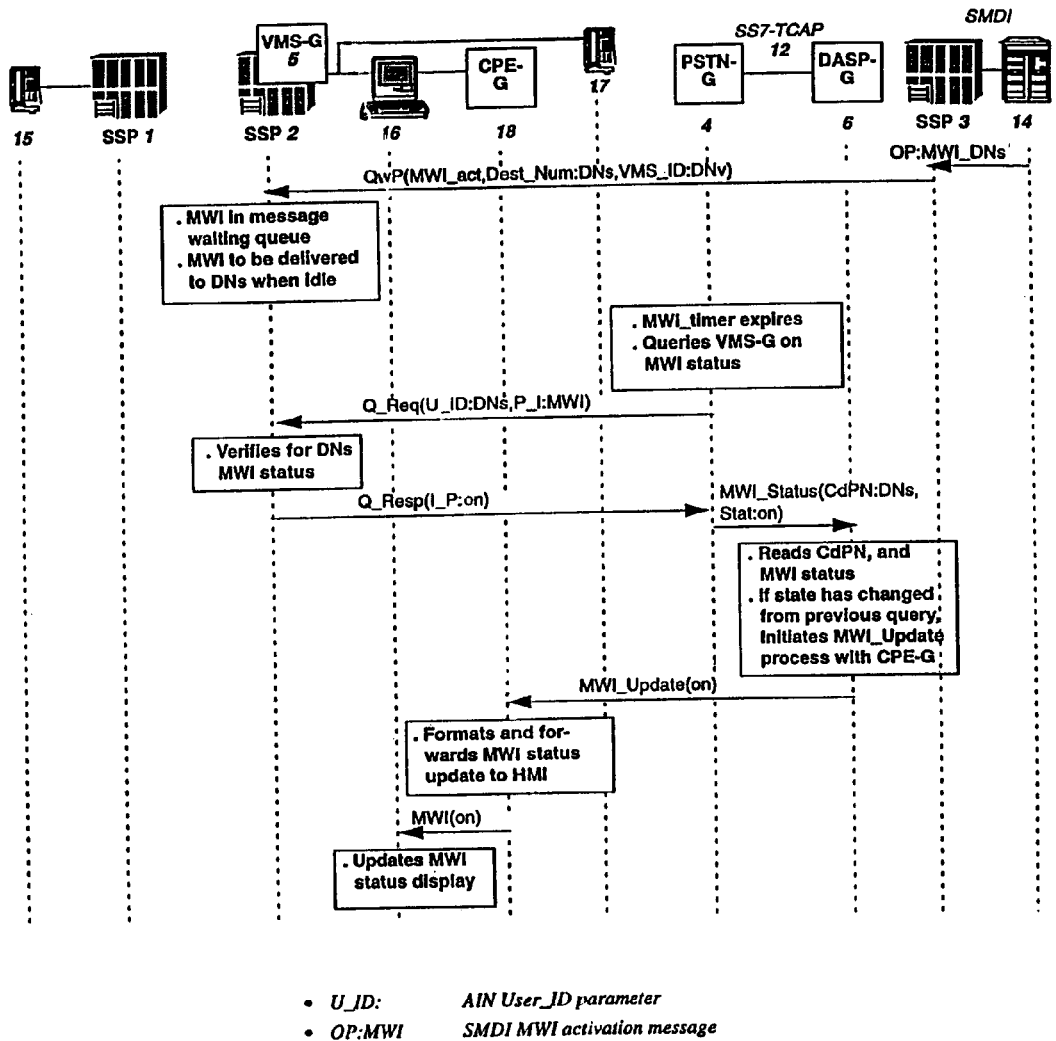
FIG. 5 graphically illustrates the message waiting indication functional flow in accordance with a further embodiment of the present invention.

In the embodiment of the invention of FIG. 5, the VMS-G (voice messaging service gateway) [5] is implemented using the AIN call model on SSP [2]. The PSTN-G [4] component is as discussed with regard to FIGS. 3 and 4. Incoming call indication, could be implemented in many ways, including but not limited to an AIN Service Control Point (SCP). The PSTN signaling capabilities used are the Signaling System #7 (SS7) Transaction Capability Application Part (TCAP) as interfaces [11], [12] and [13].

The AIN non-call associated capability VMS-G [5] at the subscriber's [17] DN. The PSTN-G [4] and the VMS-G [5] communicates using the SS7-based AIN SSP-to-SCP protocol as interfaces [11] and [13]. A possibility is for the PSTN-G [4], when an incoming call has been detected using method described in regard to FIGS. 2 and 3. Incoming call indication, to start a timer set at the subscriber's [17] maximum allowed message length. At time-out, PSTN-G [4] sends an AIN non-call related Query_Request to SSP [2] requesting for status of subscriber's [17] MWI.SSP [2] answers with the AIN Query_Response with an on/off activation status code parameter. The PSTN-G [4] then provides the DASP-G [6] with the MWI information if necessary. The DASP-G [6], through a standard data communication protocol, including but not limited to TCP/IP, HTTP and FTP, communicates the information to the CPE-G [18]. This information is then formatted and displayed to the user.

Figure 6:
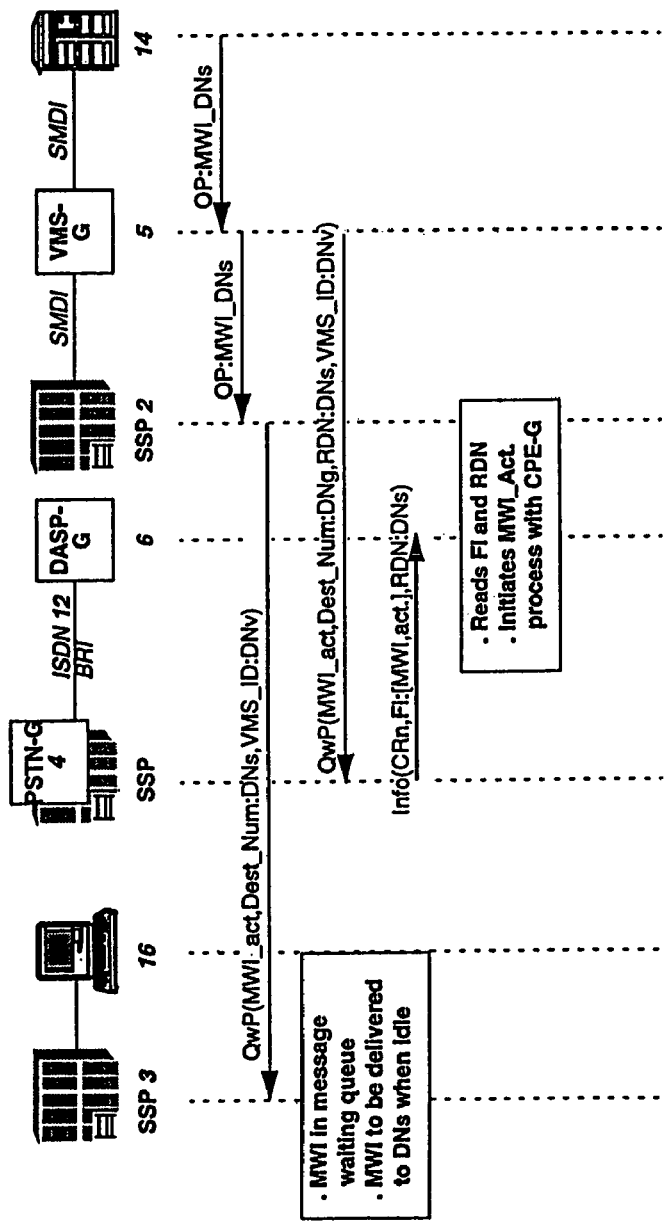
FIG. 6 graphically illustrates the message waiting indication functional flow in accordance with an additional embodiment of the present invention.

The terms used are:
Q_Req: SS7 AIN
QUERY_REQUEST SCP-SSP message
Q_Resp: SS7 AIN Query_Response SSP-SCP message
P_I: AIN Provide_Info parameter
I_P: AIN Info-Provided parameter Other implementations of this method to delivery the MWI delivery service component are possible. They include but are not limited to the following one. Referring to FIG. 6 there is illustrated an additional embodiment of the present invention, the VMS-G [5] component is implemented as an SMDI monitoring tool, the PSTN-G [4] component is implemented by a PSTN SSP and the PSTn signaling capabilities used are:
the Signaling System #7 (SS7) Transaction Capability Application Part (TCAP) as interfaces [11] and [13]
the Integrated Services Data Network—Basic Rate Interface (ISDN-BRI) as interface [12]
the Simplified Message Desk Interface (SMDI) for PSTN to VMS system signaling.

It shall be noted here that the parameter content of the TCAP messages used on interfaces 11 and 13 are not standard but adaptation of the NT proprietary TCAP messaging used to convey the MWI information.

Figure 7:
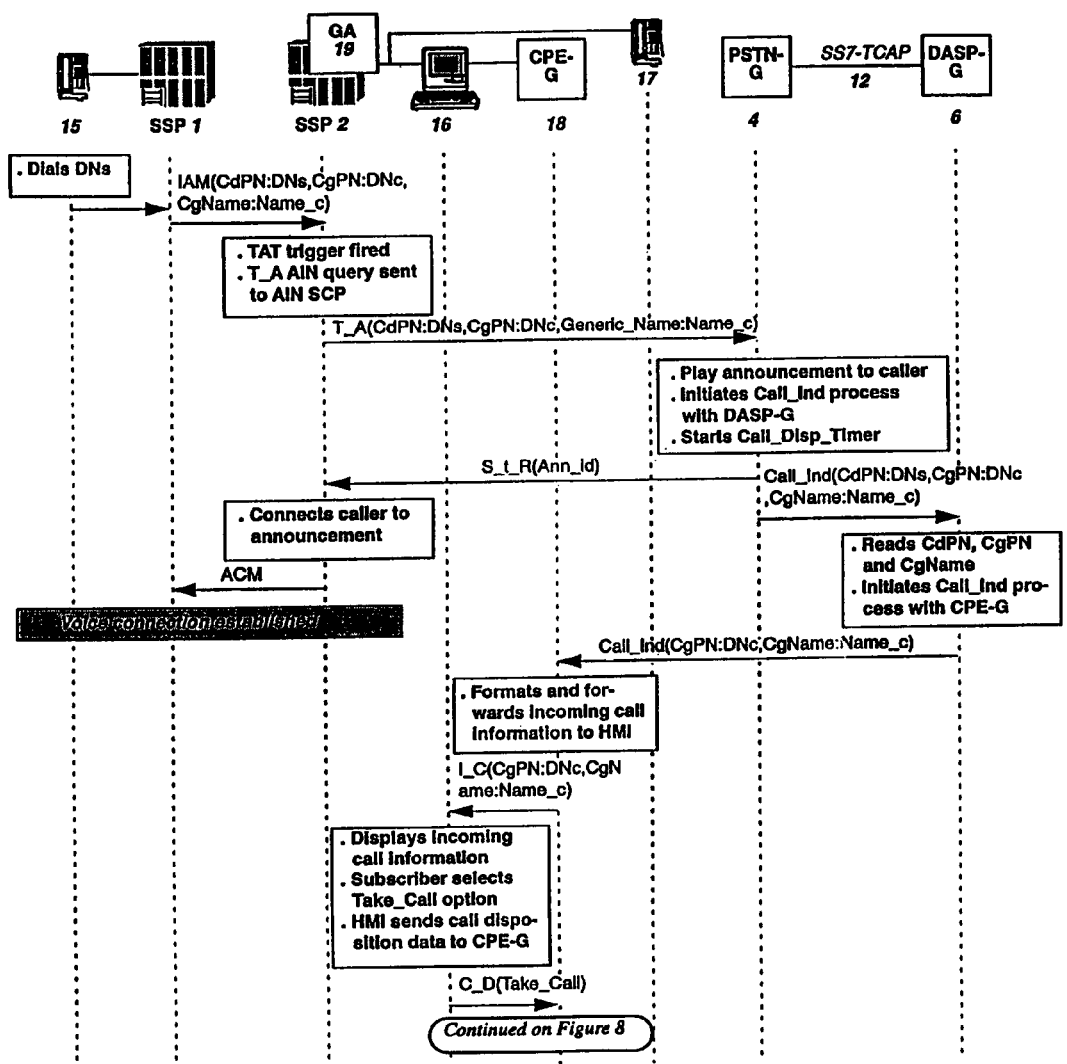
FIGS. 7 and 8 graphically illustrate the incoming call disposition functional flow in accordance with a still further embodiment of the present invention.
Figure 8:
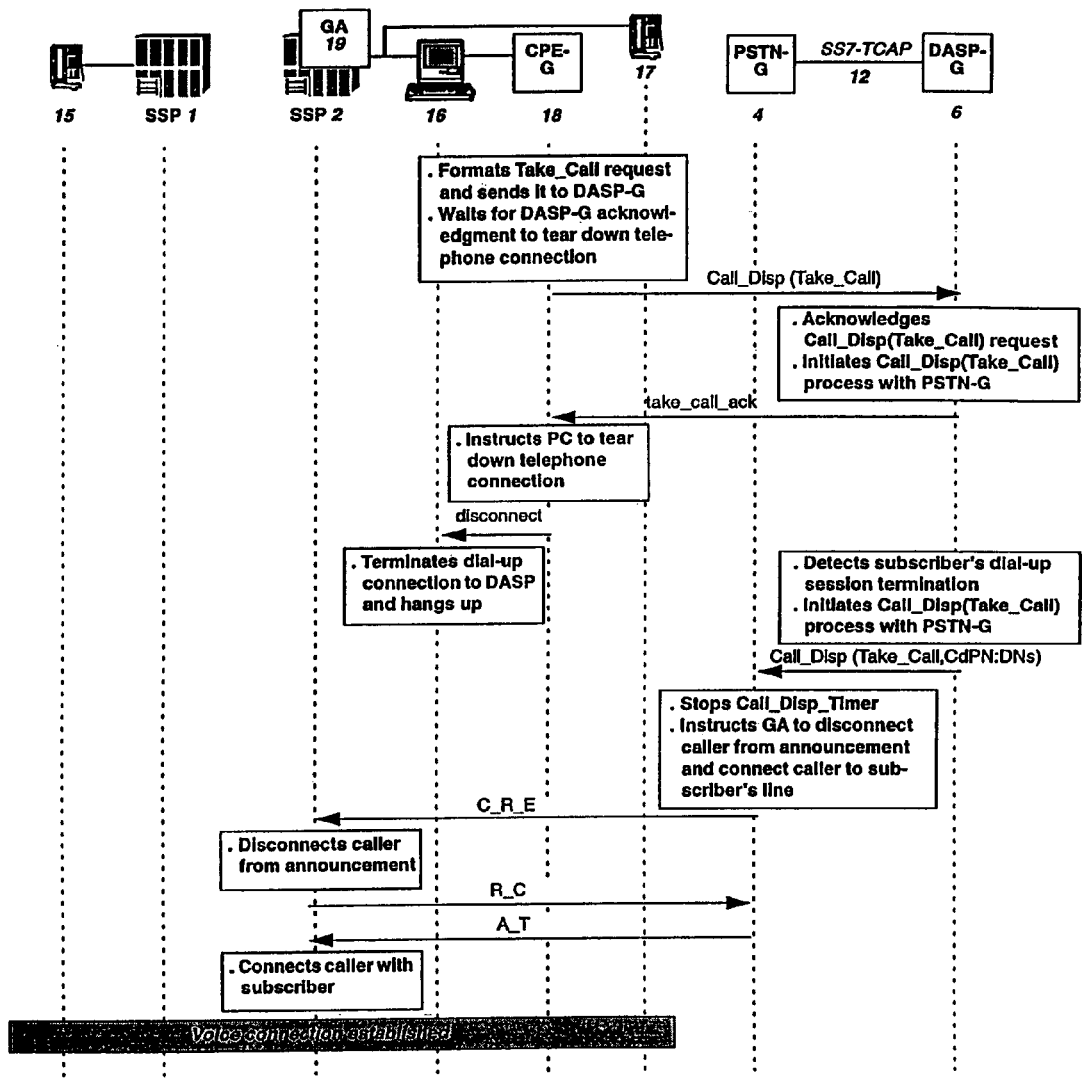

The terms used are:
QwP: SS7 TCAP Query with Permission package type
Info: ISDN BRI Information message
FI: ISDN BRI Feature Identification information element
Incoming call disposition Referring to FIGS. 7 and 8 there is illustrated a detailed functional flow for a specific implementation of the incoming call disposition service component. The following service scenario is used in the functional flow for description purposes only, the method being not limited to this service scenario:
the subscriber's telephone line is busy due to a dial-up data session to the DASP
all calls are interswitch
the subscriber decides to take the call and hence, selects the Take Call call disposition option.

In this implementation of the invention, the GA [19] is implemented using the AIN call model on SSP [2]. The PSTN-G [4] component could be implemented in many ways, including but not limited to an Advanced Intelligent Network (AIN) Service Control Point (SCP). The PSTN signaling capabilities used are the Signaling System #7 (SS7) Transaction Capability Application Part (TCAP) as interfaces [11], [12] and [20].

It shall be noticed that ALL the signaling over interfaces [12] and [9, 10] do not make reference to any existing protocol. It is provided only for sake of clarity of the whole process. The terms used are:
IAM: SS7 ISUP Initial Address Message
TAT: AIN Termination_Attempt trigger
T_A: AIN Termination_Attempt SSP-SCP message
S_t-R: AIN Send_To_Resource SCP-SSP message
C_R_E: AIN Cancel_Resource_Event SCP-SSP message
R_C: AIN Resource_Clear SSP-SCP message
A_T: AIN Authorize_Termination SCP-SSP message As discussed above with regard to FIGS. 2 and 3: Incoming call indication, the AIN call model on SSP [2] detects incoming calls to subscriber's DN using the Termination_Attempt trigger. The AIN call model also provides the remote call control capability required by the PSTN-G to control call establishment as required by the call disposition service component. To prevent situations where the caller hangs up for waiting too long, the subscriber [17] has a limited time windows (Call_Disp_Timer expires, a default treatment is provided (e.g., route to VMS). Finally, the other options of the call disposition service component (route to DN, route to VMS, route to announcement, route to canned messages, . . . ) can be implemented using the AIN Forward_Call PSTN-G [4] response to the SSP instead of the Authorize_Termination response.

Those skilled in the art will recognize that various modifications and changes could be made to the invention without departing from the spirit and scope thereof. It should therefor be understood that the claims are not to be considered as being limited to the precise embodiments set forth above, in the absence of specific limitations directed to each embodiment.

The embodiments of the invention in which an exclusive property or privilege is claimed are defined as follows:

1. In a switched telephone network, comprising:
a plurality of telephony switches interconnected in a switched traffic carrying network for carrying telephone call traffic and an associated signaling network for carrying signaling information relevant to the establishment of call paths on said traffic carrying network;
a method of processing an incoming call directed to a specified subscriber telephone line on said traffic carrying network, said specified subscriber telephone line initially in-use to connect a data terminal to a data network, said method comprising:
a. receiving a signaling message from said signaling network generated in response to said incoming call, said received signaling message received prior to establishment of a call path for said incoming call on said traffic carrying network;
b. in response to said received signaling message, dispatching a first data message indicative of said incoming call to said data terminal on said data network by way of said traffic carrying network and said specified subscriber telephone line.

2. The method of claim 1, further comprising:
c. receiving a second data message from said data terminal, said second data message indicative of a call disposition response provided to said data terminal.

3. The method of claim 2, further comprising:
d. in response to receiving said second data message, dispatching a signaling message on said signaling network to establish a call path between said incoming call and said specified subscriber telephone line on said traffic carrying network.

4. The method of claim 1, wherein said signaling network comprises an intelligent network, and wherein said received signaling message is received from a processing element forming part of said signaling network.

5. The method of claim 2, wherein said received signaling message comprises a telephone dial number identifying said specified subscriber telephone line.

6. The method of claim 5, wherein said received signaling message comprises at least one of a dial number associated with an originator of said incoming call and a name associated with an originator of said incoming call.

7. The method of claim 1, wherein said data network comprises an internet protocol compliant network, and wherein said first data message comprises a internet protocol compliant message.

8. The method of claim 6, wherein said first data message comprises at least one of a dial number associated with an originator of said incoming call and a name associated with an originator of said incoming call.

9. A notification server comprising:
a first interface for connection of said server to a telephony signaling network, said signaling network for carrying signaling information relevant to the establishment of call paths on a switched traffic carrying telephony network, said first interface adapted to receive signaling messages prior to establishment of associated call paths on said traffic carrying telephony network;

a second interface for connection of said server to a data network;

a processor operable to
- a. receive a signal indicative of an incoming call originating with a caller to a specified telephone line on said traffic carrying telephony network, by way of said signaling network;
- b. in response to receiving said signal, dispatch a data message indicative of said incoming call to a terminal in communication with said data network, by way of said specified telephone line.

10. The notification server of claim 9, wherein said processor is further operable to receive a call disposition response message from said data terminal by way of said data network.

11. The notification server of claim 10, wherein said processor is further operable to dispatch a signaling message to said signaling network to establish a path on said traffic carrying telephony network between said caller and said specified telephone line, in response to receiving said call disposition response.

12. The notification server of claim 9, wherein said signaling network comprises an advanced intelligent network (AIN) and said first interface comprises an interface to said AIN.

13. The notification server of claim 9, wherein said data message comprises an internet protocol compliant message.

14. The notification server of claim 10, wherein said processor is further operable to dispatch a signaling message to said signaling network to establish a call path between said caller and a voice mail server, in response to receiving said call disposition response message.

15. The notification server of claim 10, wherein said processor is further operable to dispatch a signaling message to said signaling network to establish a call path between said caller and a second subscriber telephone line, on said traffic carrying network, in response to receiving an appropriate call disposition signal.

16. A service control point (SCP) for use in an advanced intelligent network (AIN) forming part of a switched telephone network, said SCP configured to dispatch a signaling message to a data network gateway interconnected to a data network, in response to receiving an AIN signal indicative of an incoming call to a specified telephone subscriber line in-use to connect a data terminal to said data network.

17. A switching point, within an advanced intelligent network (AIN) telephony signaling network, said signaling network for carrying signaling information relevant to the establishment of call paths on a traffic carrying telephony network, said switching point operable to dispatch an AIN termination attempt message on said signaling network in response to an incoming call directed to a specified subscriber telephone line in use to connect a data terminal to a data network using said traffic carrying telephony network, to a telephony network gateway in communication with a data network gateway, said data network gateway operable to dispatch a data message from said over said data network to said data terminal, as a consequence of said AIN termination attempt message.

18. The switching point of claim 17, wherein said switching point is operable to generate said AIN termination attempt message in response to an AIN termination attempt trigger generated at said switching point.

19. A processing element for interconnection with a communications signaling network carrying signals relevant to establishing call paths on a traffic carrying telephone network, said processing element comprising:

a first interface for connecting said processing element with an advanced intelligent network (AIN) signaling network in communication with a switch on said traffic carrying telephone network;

a second interface for connecting said processing element with a data network gateway for dispatching data messages on a data network; said processing element operable to dispatch a first message to said data network gateway by way of said second interface in response to receiving an AIN signaling message by way of said first interface, said signal indicative of an incoming call to a specified telephone subscriber line in-use connecting a data terminal to said data network by way of said traffic carrying telephone network.

20. The processing element of claim 19, further operable to dispatch a signaling message on said first interface to establish a call path between said incoming call and said specified telephone subscriber line, in response to receiving an appropriate call disposition signal from said data network gateway on said second interface.

21. The processing element of claim 19, further operable to dispatch a signaling message on said first interface to establish a call path between said incoming call and a second subscriber telephone line, on said traffic carrying telephone network in response to receiving an appropriate call disposition signal from said data network gateway on said second interface.

22. The processing element of claim 19, further operable to dispatch a signaling message on said first interface to establish a call path between said incoming call and a voice mail system, on said traffic carrying network in response to receiving an appropriate call disposition signal from said data network gateway on said second interface.

23. The processing element of claim 19, wherein said AIN signaling message comprises an AIN call termination attempt message.

24. The processing element of claim 23, wherein said AIN call termination attempt message comprises a telephone dial number identifying said subscriber line.

25. The processing element of claim 24, wherein said AIN call termination attempt message comprises an identifier of an originator of said call, including at least one of a name and dial number associated with said call.

26. The processing element of claim 25, wherein said first message comprises at least one of said name and said dial number.

27. The processing element of claim 19, wherein said processing element is further operable to monitor a voice mail server associated with said specified subscriber telephone line, by way of said signaling network, and to provide a signal to said data network gateway indicative of a message waiting for said specified subscriber telephone line, at said voice mail server.

28. In a switched telephone network comprising:
a first switch;
a first signal switching point associated with said first switch;
a second switch;
a second signal switching point associated with said second switch;
a processing element in communication with said second signal switching point;

said first signal switching point, said second signal switching point and said processing element interconnecting in a telephony signaling network;

a method of dispatching a message indicative of an incoming call, originating with a caller interconnected with said first switch to a subscriber line interconnected with said second switch, to a terminal in communication with a data network, said method comprising:
- a. dispatching a first signaling message from said first signaling point to said second signaling point;
- b. in response to said first signaling message, dispatching a second signaling message from said second signaling point to said processing element;
- c. in response to said second signaling message, dispatching a third signaling message from said processing element to said data network gateway;
- d. in response to said third signaling message, dispatching a data message from said network gateway over said data network to said data terminal.

29. The method of claim 28, wherein said signaling network comprises an intelligent network, and wherein said second signaling message comprises a termination attempt message.

30. The method of claim 29, wherein said second signaling message is dispatched prior to establishing a call path to said second switch for said incoming call.

31. The method of claim 30, wherein said second signaling comprises a telephone dial number identifying said subscriber line.

32. The method of claim 28, wherein said signaling network comprises an advanced intelligent network (AIN), and said first and second switching points each comprise an AIN service switching point (SSP).

33. The method of claim 32, wherein said processing element comprises an AIN service control point (SCP).

34. In a switched telephone network comprising:
a first switch;
a first signal switching point associated with said first switch;
a second switch;
a second signal switching point associated with said second switch;
a processing element in communication with said second signal switching point;
said first signal switching point, said second signal switching point and said processing element interconnecting in a telephony signaling network;

a method of dispatching a message indicative of an incoming call, originating with a caller interconnected with said first switch to a subscriber line interconnected with said second switch, to a terminal in communication with a data network, said method comprising:
- a. receiving a first signaling message from said first signaling point at said second signaling point;
- b. in response to said first signaling message, dispatching a second signaling message from said second signaling point to said processing element;
- c. in response to said second signaling message, dispatching a third signaling message from said processing element to said data network gateway;
- d. in response to said third signaling message, dispatching a data message from said network gateway over said data network to said data terminal.

35. The method of claim 34, wherein said signaling network comprises an intelligent network, and wherein said second signaling message comprises a termination attempt message.

36. The method of claim 35, wherein said second signaling message is dispatched prior to establishing a call path to said second switch for said incoming call.

37. The method of claim 36, wherein said second signaling comprises a telephone dial number identifying said subscriber line.

38. The method of claim 34, wherein said signaling network comprises an advanced intelligent network (AIN), and said first and second switching points each comprise an AIN service switching point (SSP).

39. The method of claim 38, wherein said processing element comprises an AIN service control point (SCP).

\* \* \* \* \*